(12) United States Patent
Ren et al.

(10) Patent No.: US 11,934,995 B1
(45) Date of Patent: Mar. 19, 2024

(54) PACKAGE SIMILARITY PREDICTION SYSTEM

(71) Applicant: Amazon Technologies, Inc., Seattle, WA (US)

(72) Inventors: Huinan Ren, Seattle, WA (US); Nicole Yoshino, Seattle, WA (US); Kristin Quel Lien, Kirkland, WA (US); Abhishek Shrivastava, Bothell, WA (US); Vinit Dinesh Jain, Seattle, WA (US); Brian Gleadle, Kirkland, WA (US); Ruslan Khmeliuk, Bothell, WA (US); Michael Allen Swift, Brentwood, TN (US); Pushkar Naik, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 17/706,198

(22) Filed: Mar. 28, 2022

(51) Int. Cl.
*G06Q 10/087* (2023.01)
(52) U.S. Cl.
CPC .................. *G06Q 10/087* (2013.01)
(58) Field of Classification Search
CPC .................................................. G06Q 10/087
See application file for complete search history.

(56) References Cited

U.S. PATENT DOCUMENTS

| 7,769,221 | B1* | 8/2010 | Shakes | G06Q 10/087 705/28 |
| 10,268,984 | B1* | 4/2019 | Ramoji | G06Q 10/087 |
| 10,366,306 | B1* | 7/2019 | Raghavan | G06V 10/751 |
| 2021/0312206 | A1* | 10/2021 | Meidar | G06F 18/23213 |

OTHER PUBLICATIONS

Verma, Nishchal K., et al. "Object identification for inventory management using convolutional neural network." 2016 IEEE Applied Imagery Pattern Recognition Workshop (AIPR). IEEE, 2016. (Year: 2016).*

* cited by examiner

*Primary Examiner* — Nathan A Mitchell
(74) *Attorney, Agent, or Firm* — Kilpatrick Townsend & Stockton LLP

(57) ABSTRACT

Techniques for predicting a manufacturer and/or contents of a received package are described herein. Images of a package may be received from cameras. A visual vector for the package in a vector space of package attributes may be generated using the images. Physical attributes of the package may be received. A subset of candidate packages may be determined by comparing the physical attributes of a plurality of historically received packages to the physical attributes of the package. A ranking of the subset of candidate packages may be determined by identifying a distance in the vector space of the package attributes between a vector for the subset of candidate packages and the visual vector for the package. An identifier associated with a particular package of the ranked subset of candidate packages may be obtained. Data for the particular package may be retrieved from a database using the identifier.

20 Claims, 10 Drawing Sheets

PACKAGE SIMILARITY PREDICTION SYSTEM

BACKGROUND

More and more users and entities are turning to online services for day-to-day activities. Many of the services span both the digital world and the physical world. For example, a user may operate a computing device and access a web site to purchase an item. The user may specify a delivery destination. The item may be delivered from a storage facility to the delivery destination. Many modern inventory fulfillment systems consolidate, ship, and otherwise handle a large volume of inventory items. Often times, reductions in shipping time and/or other advantages may be obtained by maintaining stocks of inventory at various locations that are geographically near to the end-users that submit orders for fulfillment. However, costs of building, organizing, and efficiently operating such facilities grows in complexity as more and more items are offered and more users purchase items for delivery.

BRIEF DESCRIPTION OF THE DRAWINGS

Various embodiments in accordance with the present disclosure will be described with reference to the drawings, in which.

DETAILED DESCRIPTION

Figure 1:
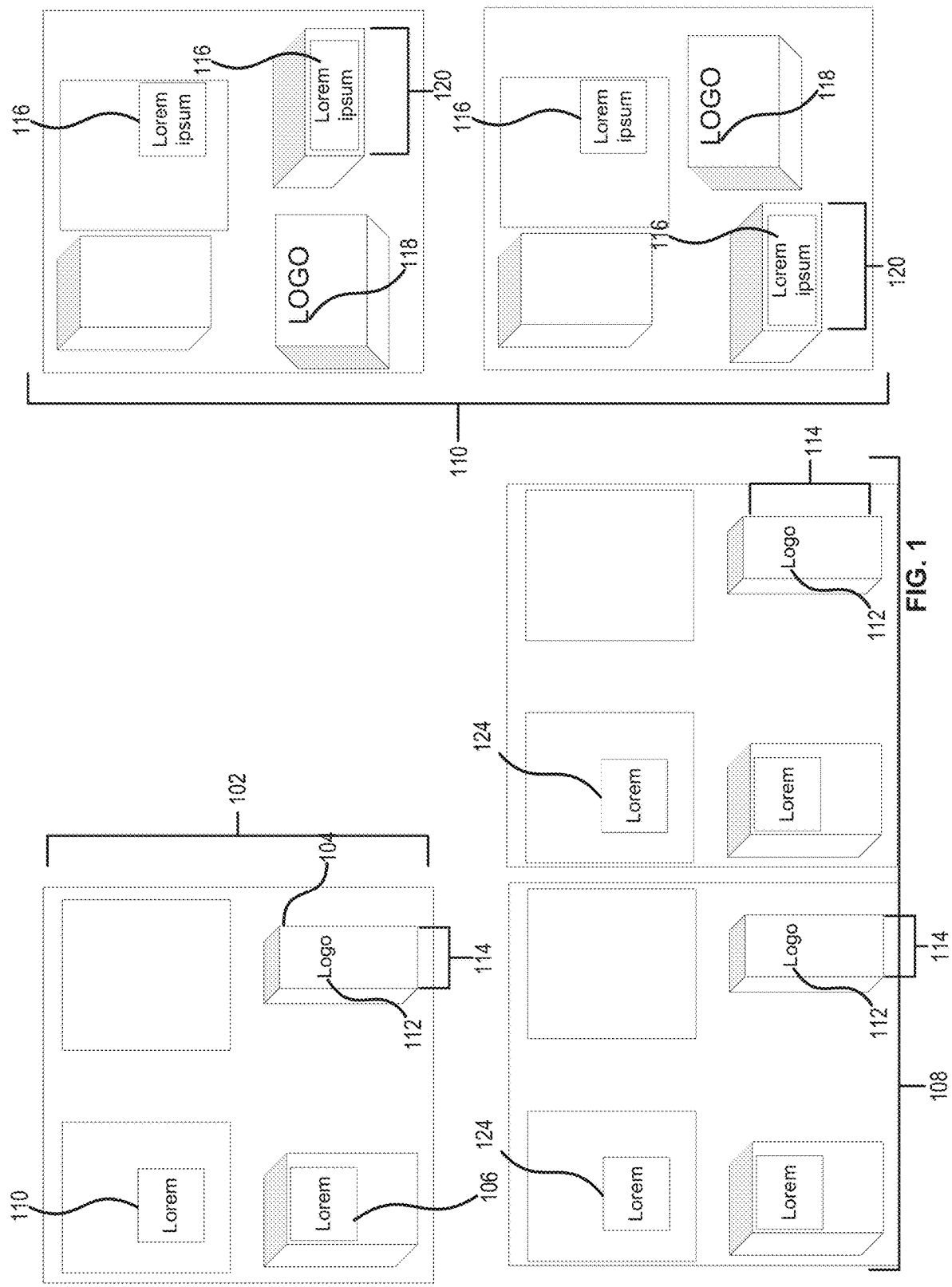
FIG. 1 illustrates an example of a query for a similar package as well as results generated by the similarity feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to systems and methods for predicting attributes for a package based on their similarity to another known package. The attributes (package attributes) may correspond to an origin location of the package, a manufacturer of the package, item identifier included in the package, as well as a number of the item included in the package. A similarity feature, implemented by one or more service provider computers (service provider computers) may generate an accurate fingerprint prediction for a given package based on comparing images, text, or other attributes of the package to other historically received packages within a vector space. In accordance with at least one embodiment, a facility that is configured to receive and process thousands of packages may include a receiving area. The receiving area may utilize a plurality of cameras for capturing images, from multiple angles, of a received package. The receiving area of the facility may also include one or more sensors for obtaining other data for the package such as physical dimensions or weight of the package. Images obtained by the service provider computer implementing the similarity feature may be modified to remove background noise as well as artifacts using computer vision techniques such as image segmentation. Image segmentation techniques may refer to one or more algorithms or computer vision techniques for blurring the background noise of an image to focus more on an object in the foreground (e.g. the package in images obtained by the plurality of cameras).

The service provider computers may utilize the images of the received package to generate a visual vector in a vector space of package attributes. In embodiments, the service provider computers may implement an optical character recognition (OCR) algorithm to extract text from the images of the received package. The service provider computers may generate a text vector for the received package. In embodiments, machine-readable codes (bar codes or QR codes) may be extracted from the images of the received package using the OCR algorithm or other suitable techniques. The machine-readable codes may be decoded to determine information for the received package such as content, manufacturer, dimensions, etc. The visual vector and text vector may be combined to generate a combined vector which includes both vectors. In embodiments, the service provider computers may maintain and update vectors, attributes (physical dimensions, weight, machine-readable codes), and data for historically received packages. In accordance with at least one embodiment, a subset of packages which may represent candidate packages that might be similar to the received package, may be determined by comparing the attributes of the received package to the attributes of potential candidate packages maintained by the service provider computers. For example, if the weight, as obtained by the sensors of the facility, identify that a received package is 5 lbs., the service provider computer may remove all packages from consideration which are not 5 lbs., or close to 5 lbs.

The service provider computers may rank the subset of candidate packages by comparing the vector of each candidate package of the subset of package to the vector(s) of the received package in the vector space of package attributes. In accordance with at least one embodiment, the service provider computers may utilize a nearest neighbor algorithm to determine a distance between the compared vectors within the vector space of package attributes. By representing attributes of the packages in the vector space the service provider computers may identify similar packages by determining packages that are nearest to received package, in distance, within the vector space; and identify dissimilar packages by determining packages that are further away from the received package, in distance, within the vector space. In accordance with at least one embodiment, the candidate packages that are most similar to the received package (e.g., smallest distance between the candidate packages and the received package within the vector space) may be ranked by their distance from the received package within the vector space. In embodiments, each historically received package and generated vector for said package may be associated with an identifier. The service provider computer may maintain and be in communication with a database which maintains mappings of identifiers to data for packages. For example, a given identifier of BG789 may correspond to data for a particular package from a particular manufacturer which includes items A in quantity X.

The service provider computers may retrieve data for the package which corresponds to the identifier and associate the data with the received package without manually opening the received package. The similarity features described herein predict the contents and origin of a received package by comparing data of or generated from the received package to known packages (historically received). The data of the known package is then used to predict the contents and origin of the received package without the process of manually opening the package to determine the contents. The service provider computers, upon determining to associate the data from a known package to the received package, may generate instructions for components of a facility to route or transport the package to a particular destination within the facility based on the data. For example, the data associated with the received package may indicate a certain manufacturer that is typically stored within a certain location of the facility. The instructions may identify particular component(s), routes for the components to utilize, and the received package to transport, route, or otherwise process the received package. In embodiments, the instructions may include specific routes for a component to utilize while transporting the received package from a receiving area to a particular location within the facility, speeds at which to travel, as well as modulation of particular mechanisms for the components such as propulsion mechanisms, direction mechanisms, etc.

The service provider computers may implement and update one or more machine learning algorithms to identify certain features within images of received packages, package shapes, label patterns, and generate accurate vectors (visual and text) using data from the historically received packages as well as newly ingested data for packages received at the facility (pictures and data obtained by sensors for incoming packages). The similarity features described herein provide several improvements over conventional package fingerprinting techniques as well as package receiving operations for facilities. Conventional package fingerprinting techniques may rely on receiving and processing a certain number of machine-readable codes for a given package to create a carton fingerprint for that package. Moreover, conventional package fingering printing systems are built utilizing structured data comparison (matching exact weights and dimensions between packages) which are inflexible and are not built to allow the introduction of new metrics or captured data. The similarity features described herein provide advantages over conventional techniques by pre-training a machine learning model to generate vectors within a vector space of package attributes as well as generate the vectors for received packages. The vectors generated by the service provider computers can be updated or modified based on new types of data (not limited to exact weights and dimensions). The machine learning model implemented by the service provider computer can still give accurate predictions for package similarity by comparing distances within the vector space so as to identify a newly received package that has not ever been received by the system to similar previously received packages. Additionally, the service provider computers may efficiently retrieve data from a received package, generate the vector(s), and compare the vectors to vectors of other packages within the vector space and make a prediction of the package (retrieve data from the most similar package to associate with the received package) than conventional carton fingerprinting techniques which rely on computationally expensive techniques for comparing structured data between packages.

FIG. 1 illustrates an example of a query for a similar package as well as results generated by the similarity feature, in accordance with at least one embodiment. FIG. 1 depicts images of a received package at 102. The images of the received package 102 include multiple angles of the same package as obtained by a plurality of cameras of a facility (not pictured). As described herein, the plurality of cameras may be situated at a receiving area of a facility and placed in such a configuration so as to capture multiple angles of a package. In embodiments, the similarity feature described herein attempts to predict information about the received package 102 without manually inspecting or opening the received package. The similarity feature as implemented by the service provider computers include generating vectors from the images of the received package 102 (e.g., visual vector and text vector). For example, the service provider computers may utilize the images of the received package 102 to generate a visual vector which represents the characteristics of the received package 102 within a vector space of package attributes. The visual vector may include a semantic relationship that represents the characteristics of the received package such as the shape, label placement, logos, etc.

In accordance with at least one embodiment, the service provider computers may be configured to implement an OCR algorithm to extract text 104 from labels as well as machine-readable codes 106 from the images of the received package 102. The service provider computers may be configured to decode the machine-readable codes 106 to obtain information about the package. The service provider computers may use the text 104 extracted from the images of the received package 102 to generate a text vector for the package. In embodiments, the visual vector and text vector derived from the images of the received package 102 may be combined into a combined vector. This combined vector may be compared to other vectors generated by the service provider computers for historically received and analyzed packages. The comparison of the vectors can occur in the vector space of package attributes where distance between the vectors indicates similarity or dissimilarity using a nearest neighbor algorithm. For example, packages whose vectors are close together (i.e., small distance between the compared vectors within the vector space of package attributes) are more similar than those packages whose vectors are further apart (i.e., greater distance between the compared vectors within the vector space of package attributes).

In accordance with at least one embodiment, the service provider computers implementing the similarity feature may execute a query to identify packages which are similar to the received package whose images are captured and represented at 102. Similar packages would be those packages with similar dimensions, weight, text, logos, manufacturer, and content (items and quantity of items). FIG. 1 includes two results or output from the similarity feature described herein (108 and 110). The images at 108 represent two packages which are more similar to the package at 102 than the images at 110 for two other packages. As illustrated in FIG. 1, the images at 108 depict two historically received packages which are more similar to the package whose images are depicted in 102 than the two historically received packages in images 110. For example, the packages in images 108 include similar label placement 124, logo placement 112, and similar shape 114. The similarity between the packages represented in images 102 and 108 would correspond to a closer distance between their generated vectors within the vector space of package attributes. As described herein, the service provider computers may maintain identifiers for the packages depicted in 108 which is associated with data for the packages depicted in 108. The data may include a manufacturer of the packages depicted in 108 as well as the content of the packages depicted in 108.

The data for the packages depicted in 108 may be associated with the package depicted in images 102. By associating the data from a similar package (associating the data from the packages depicted at 108 to the package depicted at 102) the content and identity of the package depicted in 102 has been predicted by the similarity feature. As described herein, the service provider computers may generate instructions for transporting the package depicted in 102 to a particular location within the facility based on the associated data. The packages depicted in images 110 may be determined, by the service provider computers, to be too dissimilar to the package depicted in 102 based on the distance between their vectors within the vector space of package attributes. As depicted in FIG. 1, the images 110 for the dissimilar packages have different label placement and size 116, different logo size and placement 118, and a different overall shape 120.

Figure 2:
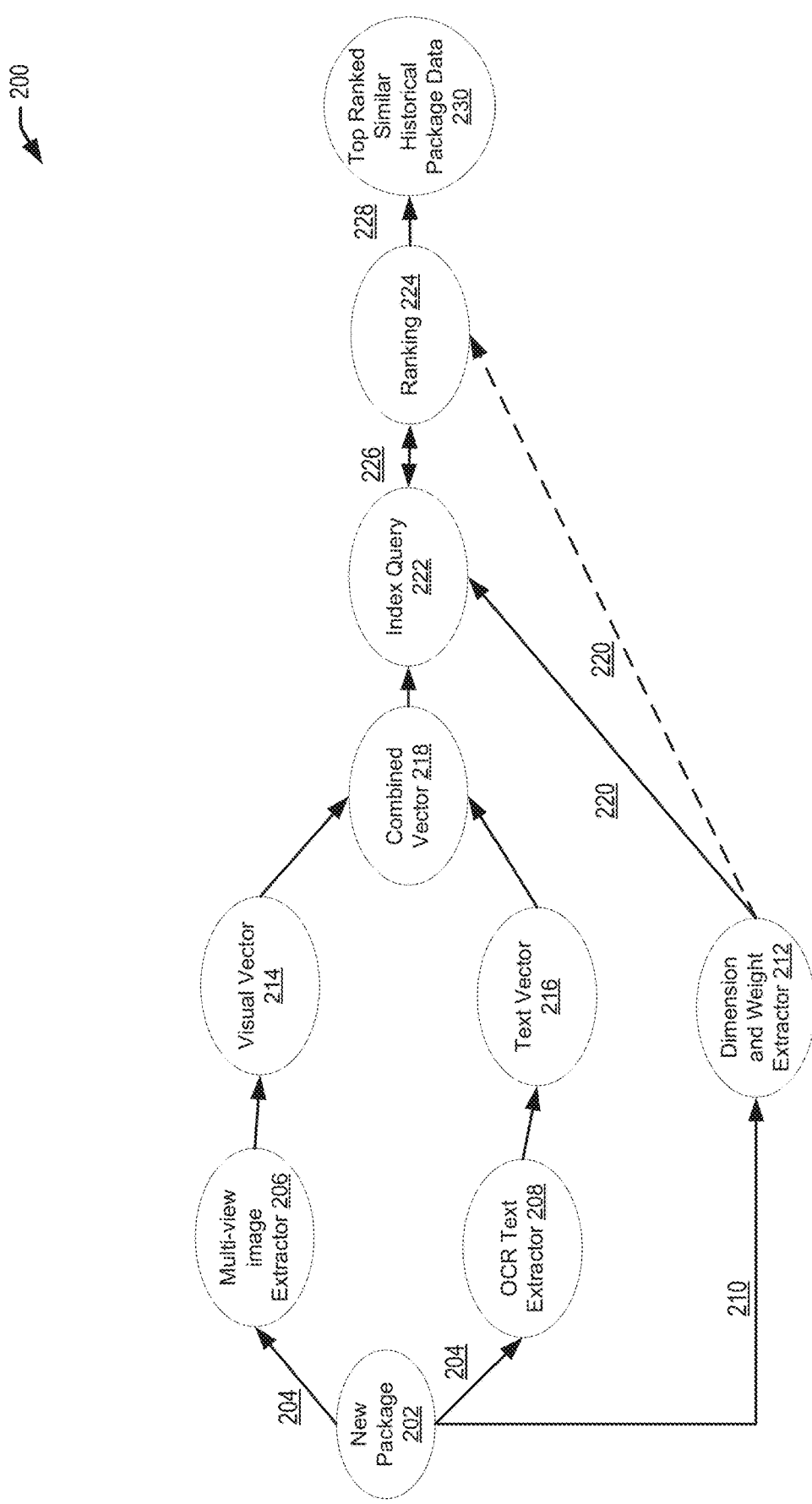
FIG. 2 illustrates an example workflow for a similarity feature using a visual vector, a text vector, and physical attributes of a package, in accordance with at least one embodiment.

FIG. 2 illustrates an example workflow for a similarity feature using a visual vector, a text vector, and physical attributes of a package, in accordance with at least one embodiment. FIG. 2 depicts workflow 200 for a similarity feature as described herein. A service provider computer implementing the similarity feature may receive images of a package (new package 202) as well as obtain physical attributes for the new package 202. The images may be obtained by a plurality of cameras configured to capture multiple angles of the new package 202 and the physical attributes may be captured or obtained by one or more sensors (weight, LIDAR, time of flight sensors, etc.,) configured to capture physical attributes for the new package 202. The images may be provided as input 204 to a multi-view image extractor 206 and OCR text extractor 208. The multi-view image extractor 206 and OCR text extractor 208 may be implemented by the service provider computers. In workflow 200 the physical attributes or sensor data may be provided as input 210 to dimension and weight extractor 212. In embodiments, the dimension and weight extractor 212 may be implemented by the service provider computers. The service provider computer may be configured to utilize the input 210 to determine at least physical dimensions and a weight of the new package 202 using the dimension and weight extractor 212.

In workflow 200 the service provider computers may utilize the output of the multi-view image extractor 206 to generate a visual vector 214. In embodiments, the visual vector 214 may include a data representation that maps high-cardinality data of the images of the new package 202 to a lower-dimensional space that preserves the semantic representation of the characteristics of the new package 202 as included in the images of the new package 202. In accordance with at least one embodiment, the multi-view image extractor 206 may be configured to utilize one or more computer vision algorithms to remove background noise and artifacts from the input 204 (images of new package 202). Workflow 200 also includes the service provider computers utilizing the output from the OCR text extractor 208 to generate a text vector 216. In embodiments, the text vector 216 may include a data representation that maps high-cardinality data of the text extracted from the images of the new package 202 to a lower-dimensional space that preserves the semantic representation of the characteristics of text of the new package 202 as included in the text extracted from the images of the new package 202. In accordance with at least one embodiment, the visual vector 214 and text vector 216 may be combined into a combined vector 218 that maintains the semantic representation of the characteristics of the images and the text extracted from the images of the new package 202. In accordance with at least one embodiment, the service provider computers may utilize an embedding model that uses the images, text, video, or graph point-cloud data of the new package 202 to generate the visual vector 214, text vector 216, and/or the combined vector 218. The output of the embedding model may include a low-dimensional vector such as a 128 bit float vector.

The workflow 200 includes the extracted physical dimensions and weight of the new package 202 as determined by the dimension and weight extractor 212 being provided as input 220 to the index query module 222. In embodiments, the service provider computers may implement one or more modules, models, or applications such as the index query module 222 as well as the ranking module 224. Workflow 200 depicts index query module 222 determining a subset of candidate packages from a plurality of historically received packages by comparing the input 220 (e.g., physical dimensions and weight of new package 202) to physical dimensions and weights of the plurality of historically received packages. In embodiments, the index query module 222 may be configured to compare the distances between the combined vector 218 for new package 202 to vectors for the subset of candidate packages within a vector space of package attributes. The distances as well as identity of the vectors of the subset of candidate packages may be provided as input 226 to the ranking module 224. In embodiments, the service provider computer may utilize a nearest neighbor algorithm to determine the distances between the compared vectors within the vector space of package attributes. In accordance with at least one embodiment, the ranking module 224 may be configured to rank the subset of candidate packages based on their vector distance from the new package 202 in the vector space of package attributes.

The ranking module 224 may be configured to rank a candidate package of the subset of candidate packages higher than another candidate package based on the least amount of distance between their vector and the combined vector 218. As described herein, a candidate package which is most similar to the new package 202 will have a small distance between its vector and the combined vector 218 within the vector space of package attributes, whereas a candidate package which is not similar to the new package 202 will have a greater distance between its vector and the combined vector 218 within the vector space of package attributes. The ranking module 224 may be configured to select one or more of the top ranked (e.g., most similar to the new package 202 based on the least amount of distance between compared vectors within the vector space) which is represented in FIG. 2 as input 228. As illustrated in FIG. 2, the input 220 (physical dimensions and weight of new package 202) may be provided to the ranking module 224 (indicated as dashed line between dimension and weight extractor 212 and ranking module 224). In accordance with at least one embodiment, the ranking module 224 may be configured to determine the subset of candidate packages of the plurality of historically received packages by comparing the physical dimensions and weight of the new package 202 to the physical dimensions and weights of the plurality of historically received packages. For example, the ranking module 224 may be configured to filter out or remove from consideration all historically received packages which do not have the same or exact weight and physical dimensions as those of new package 202.

In embodiments, the ranking module 224 may utilize a less stringent match comparison to determine the subset of candidate packages (e.g., allow some leniency between comparing data attributes such as 1 metric of difference, 2, etc.,). In such embodiments, the subset of candidate packages may be provided as input 226 to the index query 222 which is configured to compare the distances of the combined vector 218 for the new package 202 to the vectors of the subset of candidate packages in the vector space of physical attributes. The index query module 222 may be configured to rank a candidate package of the subset of candidate packages higher than another candidate package based on the least amount of distance between their vector and the combined vector 218. In embodiments, the index query module 222 may return the results of the comparison of vectors of the subset of candidate packages to the new package 202 to the ranking module 224 for ranking the subset of candidate package according to their distances from the combined vector 218 in the vector space of package attributes. In either scenario, workflow 200 includes step 230 which represents the service provider computer implementing the similarity feature retrieving the data for the similar packages (the top ranked or top ranked set of candidate packages provided as input 228) using an identifier or identifiers associated with the top ranked or top ranked set of candidate packages. In embodiments, the service provider computer may associate the data for the similar packages to the new package 202 and generate instructions for further processing based on the associated data without manually opening or otherwise analyzing the new package 202. For example, the instructions may be generated and transmitted to components of the facility to transport the new package 202 from one area (such as a receiving area) to a particular area of the facility based on the associated data. The instructions may be generated for the new package 202 based on the data of the similar package(s) data 230. In accordance with at least one embodiment, the instructions may be transmitted to a computer associated with the facility and/or directly to the component(s) of the facility which identify the new package 202, the component(s), and the destination location within the facility.

Figure 3:
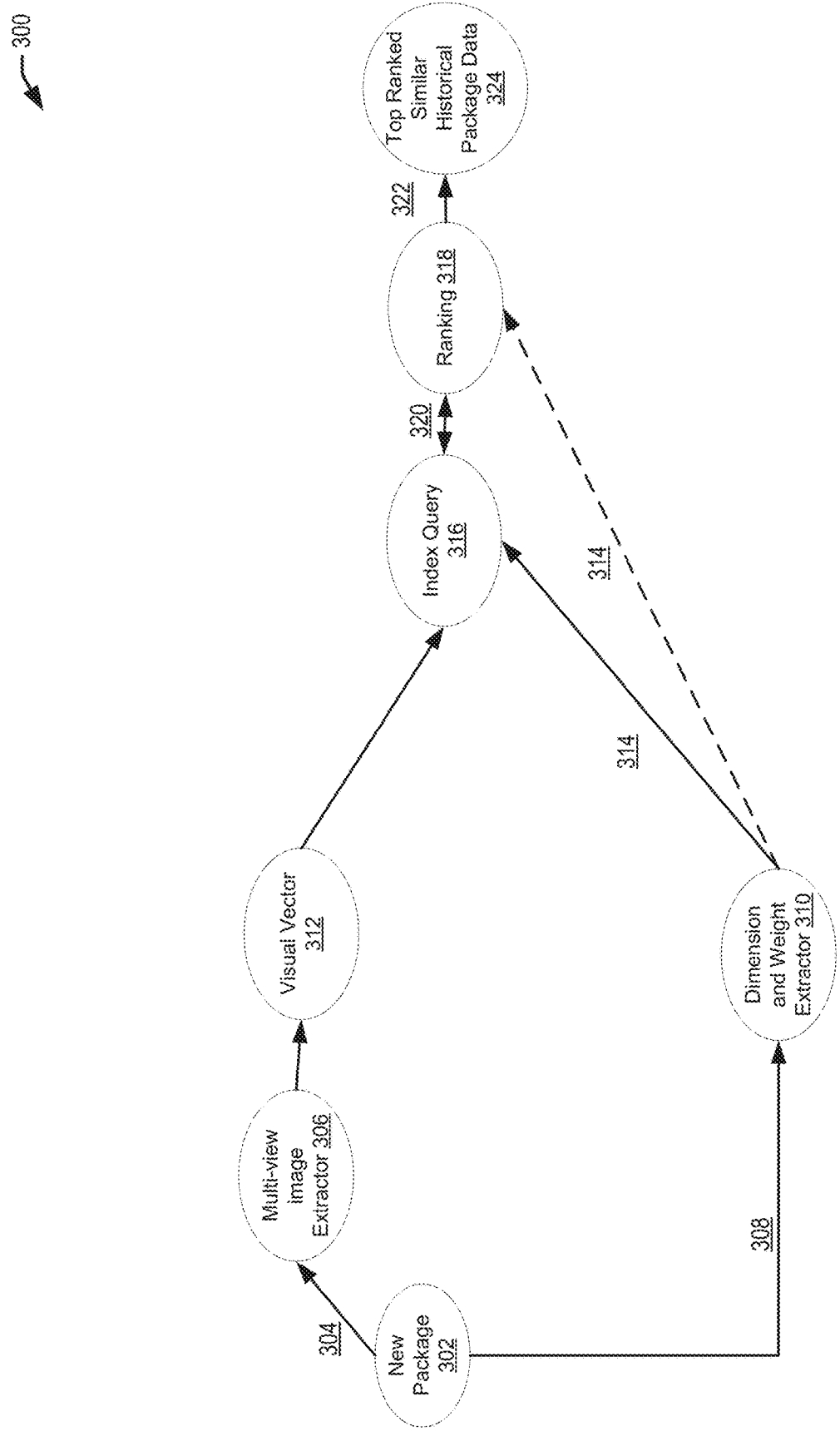
FIG. 3 illustrates an example workflow for a similarity feature using a visual vector and physical attributes of a package, in accordance with at least one embodiment.

FIG. 3 illustrates an example workflow for a similarity feature using a visual vector and physical attributes of a package, in accordance with at least one embodiment. FIG. 3 depicts workflow 300 for a similarity feature as described herein. A service provider computer implementing the similarity feature may receive images of a package (new package 302) as well as obtain physical attributes for the new package 302. The images may be obtained by a plurality of cameras configured to capture multiple angles of the new package 302 and the physical attributes may be captured or obtained by one or more sensors (weight, LIDAR, time of flight sensors, etc.,) configured to capture physical attributes for the new package 302. The images may be provided as input 304 to a multi-view image extractor 306. The multi-view image extractor 306 may be implemented by the service provider computers. In workflow 300 the physical attributes or sensor data may be provided as input 308 to dimension and weight extractor 310. In embodiments, the dimension and weight extractor 310 may be implemented by the service provider computers. The service provider computer may be configured to utilize the input 308 to determine at least physical dimensions and a weight of the new package 302 using the dimension and weight extractor 310.

In workflow 300 the service provider computers may utilize the output of the multi-view image extractor 306 to generate a visual vector 312. In embodiments, the visual vector 312 may include a data representation that maps high-cardinality data of the images of the new package 302 to a lower-dimensional space that preserves the semantic representation of the characteristics of the new package 302 as included in the images of the new package 302. In accordance with at least one embodiment, the multi-view image extractor 306 may be configured to utilize one or more computer vision algorithms to remove background noise and artifacts from the input 304 (images of new package 302). In accordance with at least one embodiment, the service provider computers may utilize an embedding model that uses the images, text, video, or graph point-cloud data of the new package 302 to generate the visual vector 312. The output of the embedding model may include a low-dimensional vector such as a 128 bit float vector.

The workflow 300 includes the extracted physical dimensions and weight of the new package 302 as determined by the dimension and weight extractor 310 being provided as input 314 to the index query module 316. In embodiments, the service provider computers may implement one or more modules, models, or applications such as the index query module 316 as well as the ranking module 318. Workflow 300 depicts index query module 316 determining a subset of candidate packages from a plurality of historically received packages by comparing the input 314 (e.g., physical dimensions and weight of new package 302) to physical dimensions and weights of the plurality of historically received packages. In embodiments, the index query module 316 may be configured to compare the distances between the visual vector 312 for new package 302 to visual vectors for the subset of candidate packages within a vector space of package attributes. The distances as well as identity of the visual vectors of the subset of candidate packages may be provided as input 320 to the ranking module 318. In embodiments, the service provider computer may utilize a nearest neighbor algorithm to determine the distances between the compared visual vectors within the vector space of package attributes. In accordance with at least one embodiment, the ranking module 318 may be configured to rank the subset of candidate packages based on their vector distance from the new package 302 in the vector space of package attributes.

The ranking module 318 may be configured to rank a candidate package of the subset of candidate packages higher than another candidate package based on the least amount of distance between their visual vector and the visual vector 312. As described herein, a candidate package which is most similar to the new package 302 will have a small distance between its visual vector and the visual vector 312 within the vector space of package attributes, whereas a candidate package which is not similar to the new package 302 will have a greater distance between its visual vector and the visual vector 312 within the vector space of package attributes. The ranking module 318 may be configured to select one or more of the top ranked (e.g., most similar to the new package 302 based on the least amount of distance between compared visual vectors within the vector space) which is represented in FIG. 3 as input 322. As illustrated in FIG. 3, the input 314 (physical dimensions and weight of new package 302) may be provided to the ranking module 318 (indicated as dashed line between dimension and weight extractor 310 and ranking module 318). In accordance with at least one embodiment, the ranking module 318 may be configured to determine the subset of candidate packages of the plurality of historically received packages by comparing the physical dimensions and weight of the new package 302 to the physical dimensions and weights of the plurality of historically received packages. For example, the ranking module 318 may be configured to filter out or remove from consideration all historically received packages which do not have the same or exact weight and physical dimensions as those of new package 302.

In embodiments, the ranking module 318 may utilize a less stringent match comparison to determine the subset of candidate packages (e.g., allow some leniency between comparing data attributes such as 1 metric of difference, 2, etc.,). In such embodiments, the subset of candidate packages may be provided as input 320 to the index query module 316 which is configured to compare the distances of the visual vector 312 for the new package 302 to the visual vectors of the subset of candidate packages in the vector space of physical attributes. The index query module 316 may be configured to rank a candidate package of the subset of candidate packages higher than another candidate package based on the least amount of distance between their visual vector and the visual vector 312. In embodiments, the index query module 316 may return the results of the comparison of visual vectors of the subset of candidate packages to the new package 302 to the ranking module 318 for ranking the subset of candidate package according to their distances from the visual vector 312 in the vector space of package attributes. In either scenario, workflow 300 includes step 324 which represents the service provider computer implementing the similarity feature retrieving the data for the similar packages (the top ranked or top ranked set of candidate packages provided as input 322) using an identifier or identifiers associated with the top ranked or top ranked set of candidate packages. In embodiments, the service provider computer may associate the data for the similar packages to the new package 302 and generate instructions for further processing based on the associated data without manually opening or otherwise analyzing the new package 302. For example, the instructions may be generated and transmitted to components of the facility to transport the new package 302 from one area (such as a receiving area) to a particular area of the facility based on the associated data. The instructions may be generated for the new package 302 based on the data of the similar package(s) data 324. In accordance with at least one embodiment, the instructions may be transmitted to a computer associated with the facility and/or directly to the component(s) of the facility which identify the new package 302, the component(s), and the destination location within the facility.

Figure 4:
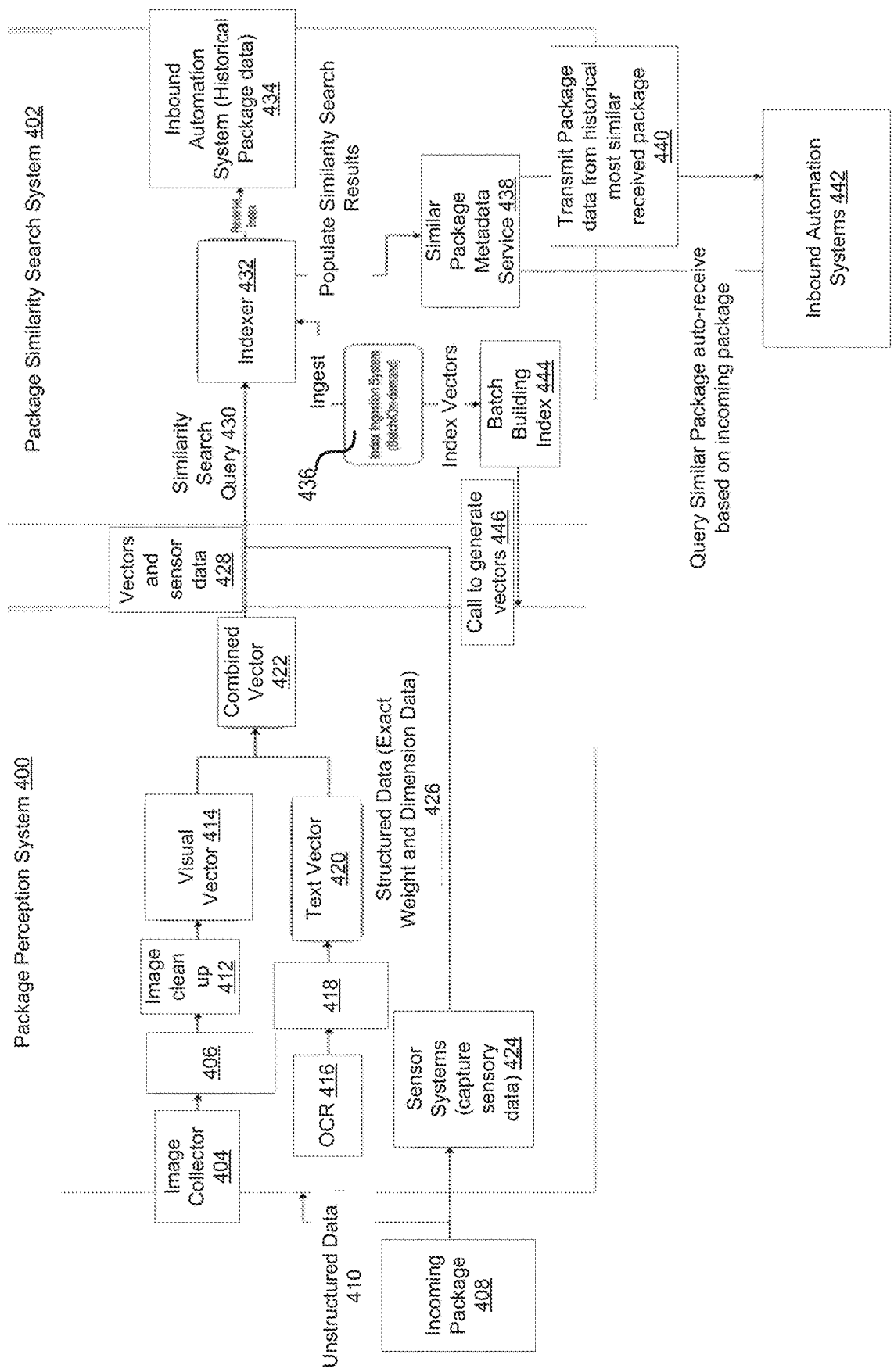
FIG. 4 illustrates an example workflow that includes a package perception system and package similarity search system implemented by a computer system executing the similarity feature, in accordance with at least one embodiment.

FIG. 4 illustrates an example workflow that includes a package perception system and package similarity search system implemented by a computer system executing the similarity feature, in accordance with at least one embodiment. FIG. 4 depicts components and workflows for package perception system 400 and package similarity search system 402. In embodiments, the package perception system 400 and package similarity search system 402 may be implemented by the service provider computers. In some embodiments, the package perception system 400 and package similarity search system 402 may be implemented by separate computer systems which are in communication via one or more networks. The package perception system includes an image collector 404 for obtaining images 406 of an incoming package 408. As depicted in FIG. 4, the image collector 404 may receive unstructured data 410 (e.g., data that is not obtained by exact sensors). In embodiments, the package perception system 400 may implement an image clean-up process 412 for removing background noise and artifacts from the images 406 of the incoming package 408. For example, the package perception system 400 may utilize one or more computer vision techniques for removing background noise and artifacts from the images 406 to analyze a more accurate version of the images 406 for incoming package 408.

As described with reference to FIGS. 2 and 3 and herein, the package perception system may utilize the images 406 and/or cleaned up images from the image clean-up process 412 to generate a visual vector 414 that represents the characteristics of the incoming package 408 derived from the images 406. Simultaneously, the package perception system 400 may utilize OCR algorithms 416 to extract text 418 included in the images 406 or from other information of the incoming package 408 (e.g., unstructured data 410). The package perception system 400 may generate a text vector 420 using the extracted text 418 for the incoming package 408. In embodiments, the package perception system 400 may generate a combined vector 422 which includes the text vector 420 and the visual vector 414. The package perception system 400 of FIG. 4 also includes sensor systems 424 which may include one or more sensors such as weight scales, physical dimension calculators, time of flight sensors, or other suitable sensors for capturing sensory data (such as physical dimensions and weight) of the incoming package 408. The data captured by the sensory system 424 may be referred to as structured data 426.

As illustrated in FIG. 4, the vectors and sensor data 428 may be transmitted to the package similarity search system 402 as part of a similarity search query 430. The package similarity search system 402 may include an indexer 432 that is configured to determine a subset of candidate packages using the sensor data 428 from historically received packages, and each candidate package of the subset of packages based on comparing vectors for each candidate package to the combined vector 422 included in 428 in a vector space of package attributes. As depicted in FIG. 4, the indexer 432 may be configured to retrieve or request data or metadata 434 that is associated with the top ranked similar packages using identifiers associated with the top ranked similar packages. The indexer 432 may be configured to provide the data or metadata 434 for the similar packages to an index ingestion system 436 as well as a similar package metadata service 438. In embodiments, the package similarity search system 402 and similar package metadata service 438 may be configured to transmit package data from historically most similar received packages 440 to an inbound automation system 442.

The inbound automation system 442 may be configured to generate and transmit instructions to components of a facility in communication with the service provider computers, package perception system 400, and package similarity search system 402 via available networks for performing a task associated with the incoming package 408. For example, the instructions may identify particular components of the facility to transport the incoming package 408 in a particular stow location of the facility or to transport the incoming package 408 to another location of the facility for further processing. The index ingestion system 436 may be configured to communicate with the batch building index 444 to generate a cache of batched index results from the indexer 432 based on the query 430. The cache of batched index results may be used to request more vectors being generated 446 by the package perception system 400 using data included in the cache of batched index results.

Figure 5:
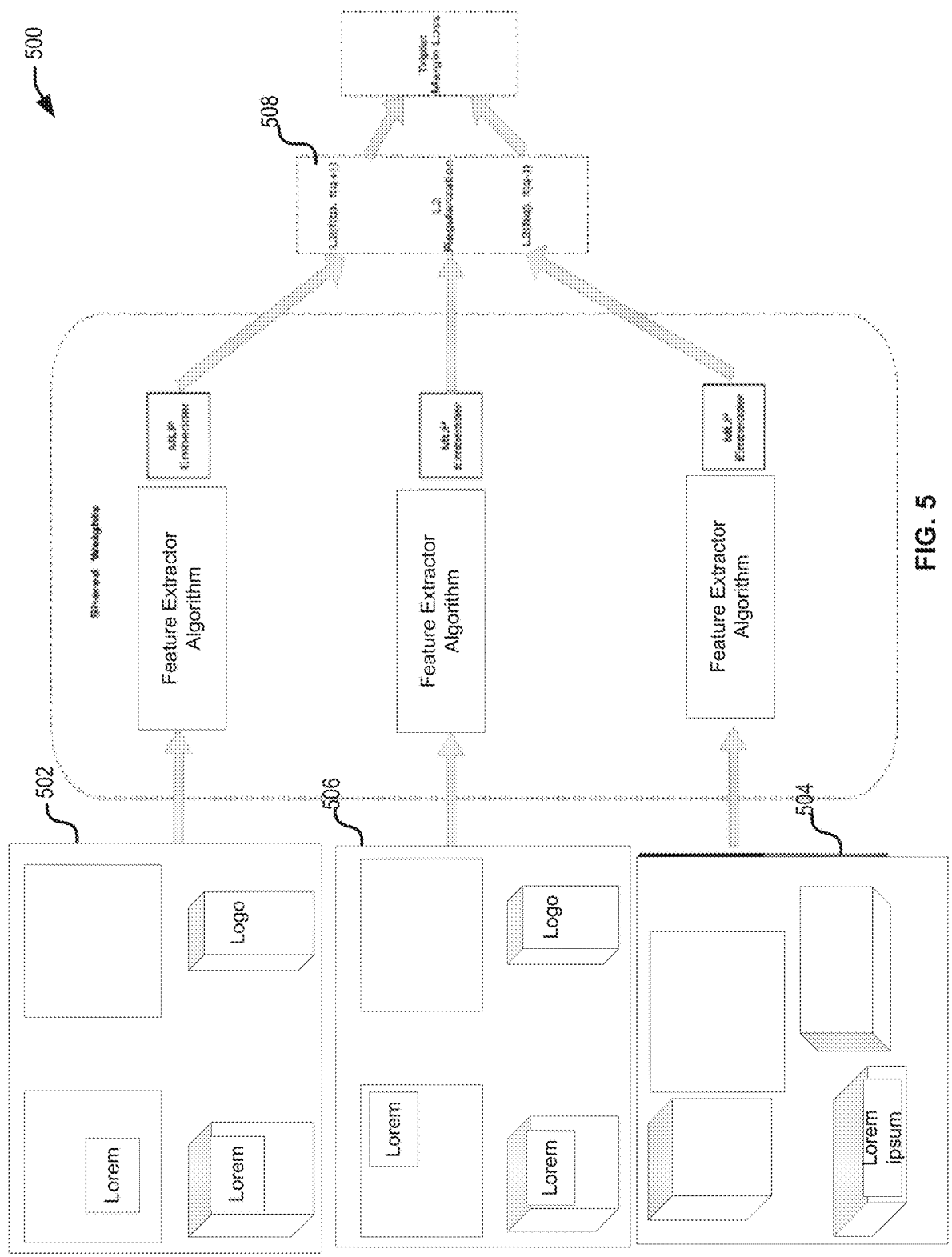
FIG. 5 illustrates an example workflow for training a machine learning algorithm using example packages for a similarity feature, in accordance with at least one embodiment.

FIG. 5 illustrates an example workflow for training a machine learning algorithm using example packages for a similarity feature, in accordance with at least one embodiment. FIG. 5 depicts an example process for training a deep learning machine learning algorithm for efficiently representing semantic similarities or distances between packages derived from high dimensional input (e.g., images and text of packages). The workflow 500 may utilize feature extractor algorithms such as a Resnet. The workflow 500 depicted in FIG. 5 illustrates a process for teaching the model to observe batches of positive samples 502 versus negative samples 504 while also utilizing an anchor sample 506. The workflow 500 may utilize a triple or pair-wise setup and apply various loss functions 508 which will result in the model learning to push apart instances of different categories while pulling similar instance closer in a projected low dimensional vector space. Once the model is trained according to at least the process illustrated in FIG. 5, the service provider computers may utilize the model to generate vectors for incoming packages and perform a nearest neighbor search in a vector space of package attributes as the model is trained to represent the semantic closeness or distance between original data in a low-dimensional vector space (vector space of package attributes).

Figure 6A:
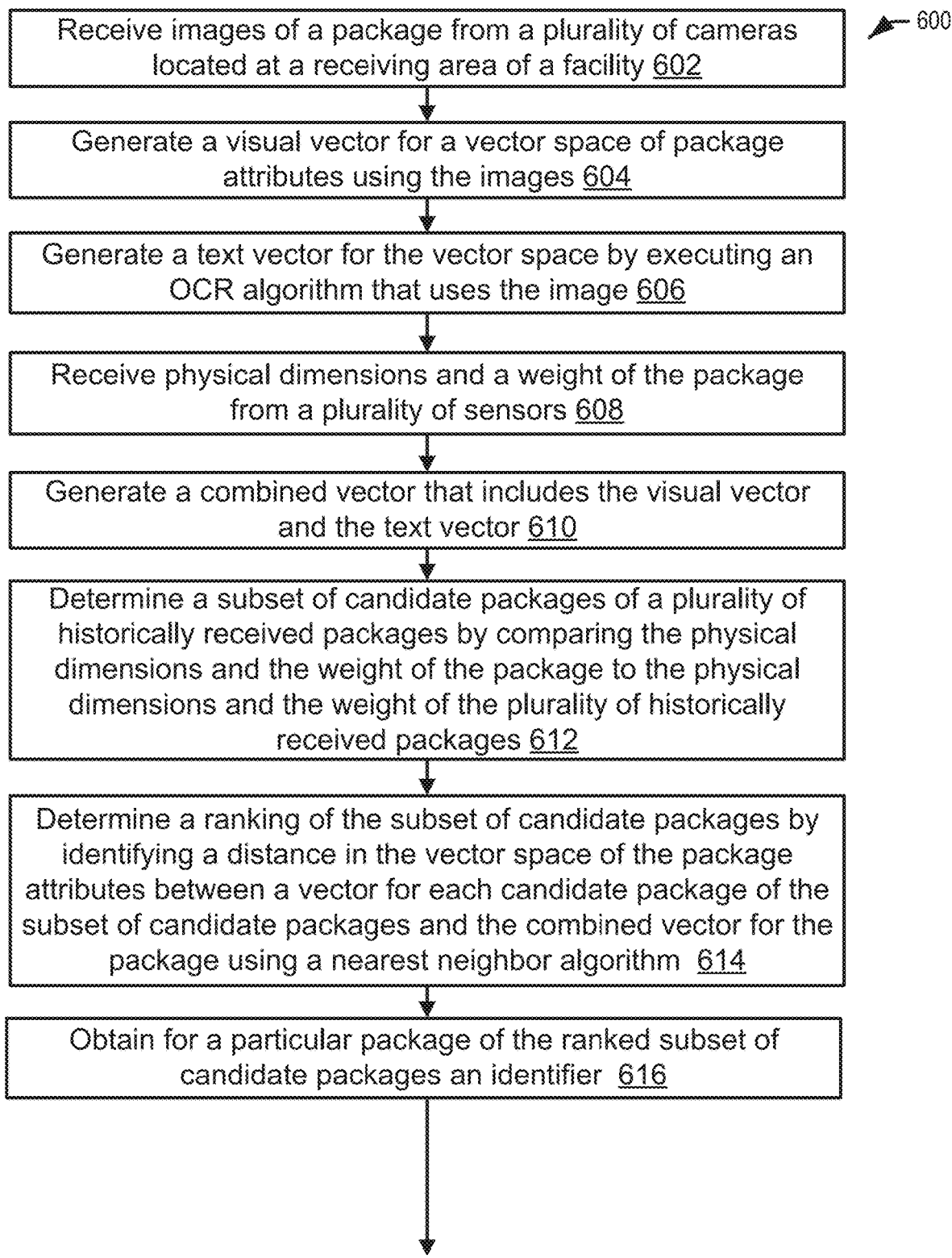
FIG. 6A illustrates an example flow diagram of an example process for a similarity feature, in accordance with at least one embodiment.
Figure 6B:
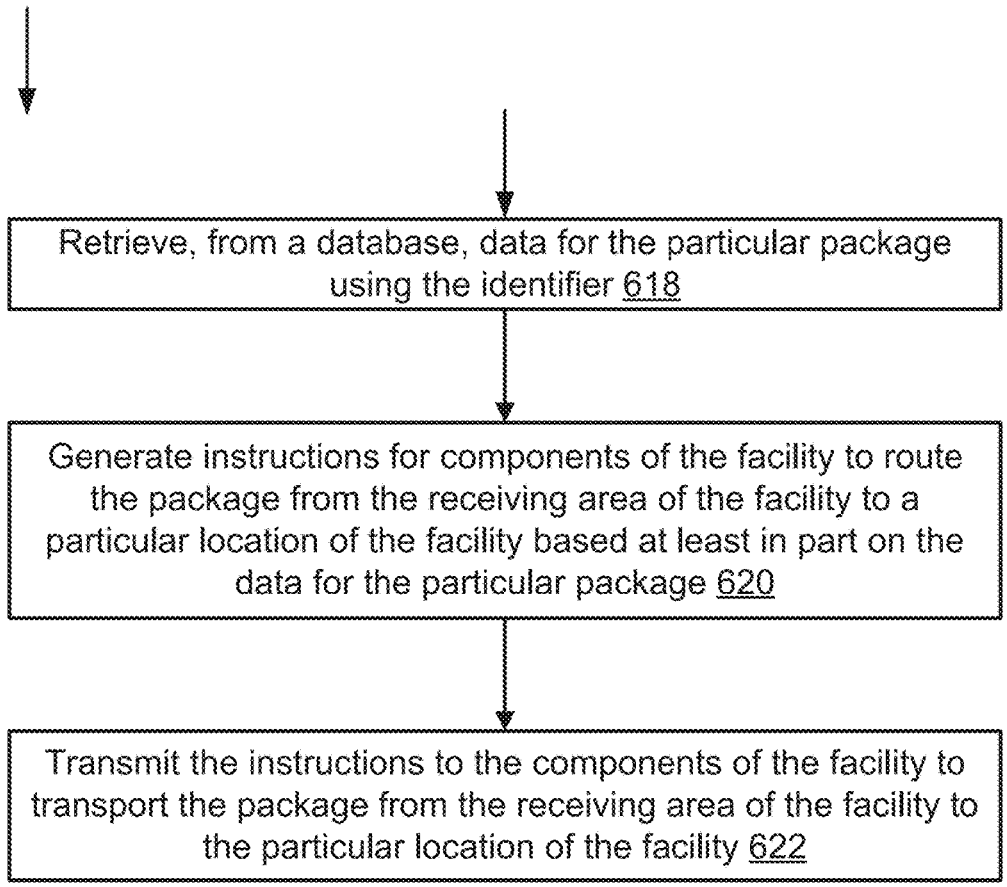
FIG. 6B illustrates an example flow diagram of an example process for a similarity feature, in accordance with at least one embodiment.
Figure 7:
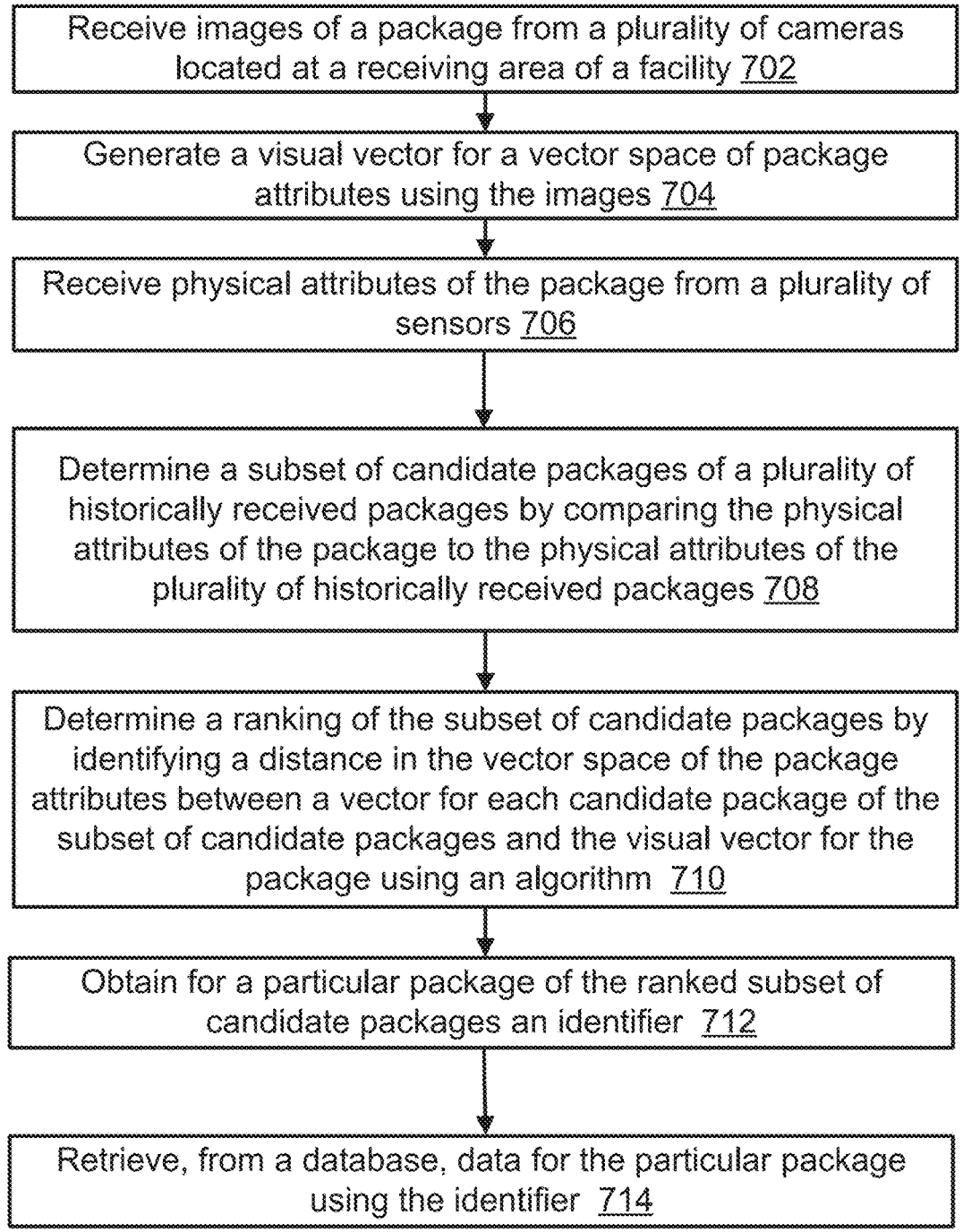
FIG. 7 illustrates an example flow diagram of an example process for a similarity feature, in accordance with at least one embodiment.

FIGS. 6A, 6B, and 7 illustrate example flow charts for similarity features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process (or any other processes described herein, or variations and/or combination thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, service provider computers (service provider computers 818) utilizing at least the similarity module 836 depicted in FIG. 7 may perform the processes 600 and 700 of FIGS. 6A, 6B, and 7. In FIG. 6A, the process 600 may include receiving images of a package from a plurality of cameras located at a receiving area of a facility at 602. In embodiments, the plurality of cameras may be situated in a certain configuration so as to capture multiple angles of the same package. In accordance with at least one embodiment, the service provider computers implementing the similarity features may be configured to implement one or more computer vision techniques for removing background noise and artifacts from the images captured by cameras of a package. The process 600 may include generating a visual vector for a vector space of package attributes using the images at 604. The process 600 may include generating a text vector for the vector space by executing an OCR algorithm that uses the image at 606. In embodiments, the service provider computers may extract machine-readable codes (barcodes, QR codes, etc.) from the images. The OCR algorithm may be used to extract text include on the package or to extract machine-readable codes which can be decoded by the service provider computers using conventional techniques. The process 600 may include receiving physical dimensions and a weight of the package from a plurality of sensors at 608. In embodiments, the physical attributes may include the physical dimensions of the package (height, depth, length) as well as the weight of the package as obtained from the sensors. In accordance with at least one embodiment, a receiving area of the facility may include the plurality of cameras as well as various sensors for obtaining the images of a package as well as physical attributes of the package (e.g., weight and physical dimensions of the package). In embodiments, the sensors may include a weight sensor, a measuring sensor such as a LIDAR system for determining a size of an object by using time of flight technology, or by comparing images of the package to an image of a known size marker to determine the dimensions of the package.

The process 600 may include generating a combined vector that includes the visual vector and the text vector at 610. In accordance with at least one embodiment, the visual vector, text vector, and combined vector may include a low dimensional vector such as a 128 bit float vector that represents a semantic representation of the various input (e.g., images, text, combined images and text) within a vector space. In embodiments, the process 600 may include determining a subset of candidate packages of a plurality of historically received packages by comparing the physical dimensions and the weight of the package to the physical dimensions and the weight of the plurality of historically received packages at 612. For example, the service provider computers may be configured to filter out or remove packages for consideration as similar to the package in question based on the physical attributes (physical dimensions and weight) between a potential candidate packages being different. The difference may be anything other than an exact match or various tolerances of differences between the physical attributes of the packages may be implemented by the service provider computers when generating the subset of candidate packages. The process 600 may include determining a ranking of the subset of candidate packages by identifying a distance in the vector space of the package attributes between a vector for each candidate package of the subset of candidate packages and the combined vector for the package using a nearest neighbor algorithm at 614. In embodiments, the higher ranked candidate package represents a more similar package to the package in question, while a lower ranked candidate package represents a less similar package to the package in question.

The process 600 may include obtaining an identifier for a particular package of the ranked subset of candidate packages at 616. For example, the particular package may be the top ranked candidate package of the subset of candidate packages. In some embodiments, identifiers for a certain set of the subset (e.g., the top 3) ranked candidate packages may be obtained. An identifier may include an alpha-numeric string that is generated and associated with a package and is mapped, by the service provider computer or within a database, to data for the particular package. The process 600 may include retrieving, from a database, data for the particular package using the identifier at 618. The data may include a manufacturer of the particular package, an item identifier, an item category, a quantity of items, etc. The process 600 may include generating instructions for components of the facility to route the package from the receiving area of the facility to a particular location of the facility based at least in part on the data for the particular package at 620. For example, data for the particular package may include a manufacturer ID which in turn is associated with storage in a particular location of the facility. The instructions may be used to route the package to the particular location of the facility which corresponds to the manufacturer ID. The process 600 may include transmitting the instructions to the components of the facility to transport the package from the receiving area of the facility to the particular location of the facility at 622. In embodiments, the instructions may identify the package, the particular location, and a particular component for transporting the package to the particular location in the facility. In accordance with at least one embodiment, the instructions may be configured to activate, deactivate, or modulate particular mechanisms of the components for transporting the package to the particular location in the facility. For example, the instructions may identify a particular autonomous guided vehicle, a route for the particular autonomous guided vehicle to utilize while moving through the facility, as well as activation of propulsion mechanisms for the autonomous guided vehicle to transport the package to the particular location in the facility.

Other example instructions may module a speed of conveyor belts of the facility in order to transport the package to the particular location in the facility. In accordance with at least one embodiment, the distance between the combined vector of the package (or individual vectors such as visual vectors or text vectors) and the vector for each candidate package of the subset of candidate packages may be compared to a threshold distance. In embodiments, the threshold distance, which may be a value, may represent a similarity between two compared packages such that the candidate package should have an identifier retrieved for it by the service provider computers. In a similar sense, two packages compared whose distance is greater than a given threshold may represent such dissimilarity that no candidate package can reliably be determined as similar. In embodiments, the service provider computers may utilize a distance threshold and compare the distance between the vectors of the package and the vector of a candidate package within the package attribute vector space to determine similarity and therefore retrieval of the identifier for the candidate package, or non-retrieval of the identifier for the candidate package. In embodiments, if none of the compared candidate packages fall within the distance threshold (the distance between the compared vectors is greater than the distance threshold) then the service provider computers may generate and transmit instructions to the components of the facility for routing the package in question to an area of the facility for manual processing. An associate or entity associated with the facility may then open the package to identify manufacturer, item identifier, quantity, etc. In embodiments, an administrator associated with the service provider computers, an entity associated with a facility, or a manufacturer may specify the thresholds utilized to determine the ranking of the candidate packages. An associate or entity manually processing or opening the package to identify data for the package may generate verification data or data which can be provided to the machine learning algorithms implemented by the service provider computers for updating the machine learning algorithms. In embodiments, a package which has been deemed similar to a candidate package may eventually be processed by an entity and verification data regarding the prediction may also be provided to the service provider computers for updating the machine learning algorithms.

The process 700 may include may include receiving images of a package from a plurality of cameras located at a receiving area of a facility at 702. The process 700 may include generating a visual vector for a vector space of package attributes using the images at 704. In embodiments, the service provider computers may extract machine-readable codes (barcodes, QR codes, etc.) from the images. The machine-readable codes may be decoded by the service provider computers to obtain information about the package such as manufacturer ID, content, quantity, etc. The process 700 may include receiving physical attributes of the package from a plurality of sensors at 706. In embodiments, the physical attributes may include the physical dimensions of the package (height, depth, length), the weight of the package, time of flight data from sensors to the package, or point cloud data as obtained from the sensors.

In embodiments, the process 700 may include determining a subset of candidate packages of a plurality of historically received packages by comparing the physical attributes of the package to the physical attributes of the plurality of historically received packages at 708. For example, the service provider computers may be configured to filter out or remove packages for consideration as similar to the package in question based on the physical attributes (physical dimensions and weight) between a potential candidate packages being different. The difference may be anything other than an exact match or various tolerances of differences between the physical attributes of the packages may be implemented by the service provider computers when generating the subset of candidate packages. The process 700 may include determining a ranking of the subset of candidate packages by identifying a distance in the vector space of the package attributes between a vector for each candidate package of the subset of candidate packages and the visual vector for the package using an algorithm at 710.

The process 700 may include obtaining an identifier for a particular package of the ranked subset of candidate packages at 712. For example, the particular package may be the top ranked candidate package of the subset of candidate packages. In some embodiments, identifiers for a certain set of the subset (e.g., the top 3) ranked candidate packages may be obtained. The process 700 may include retrieving, from a database, data for the particular package using the identifier at 714.

Figure 8:
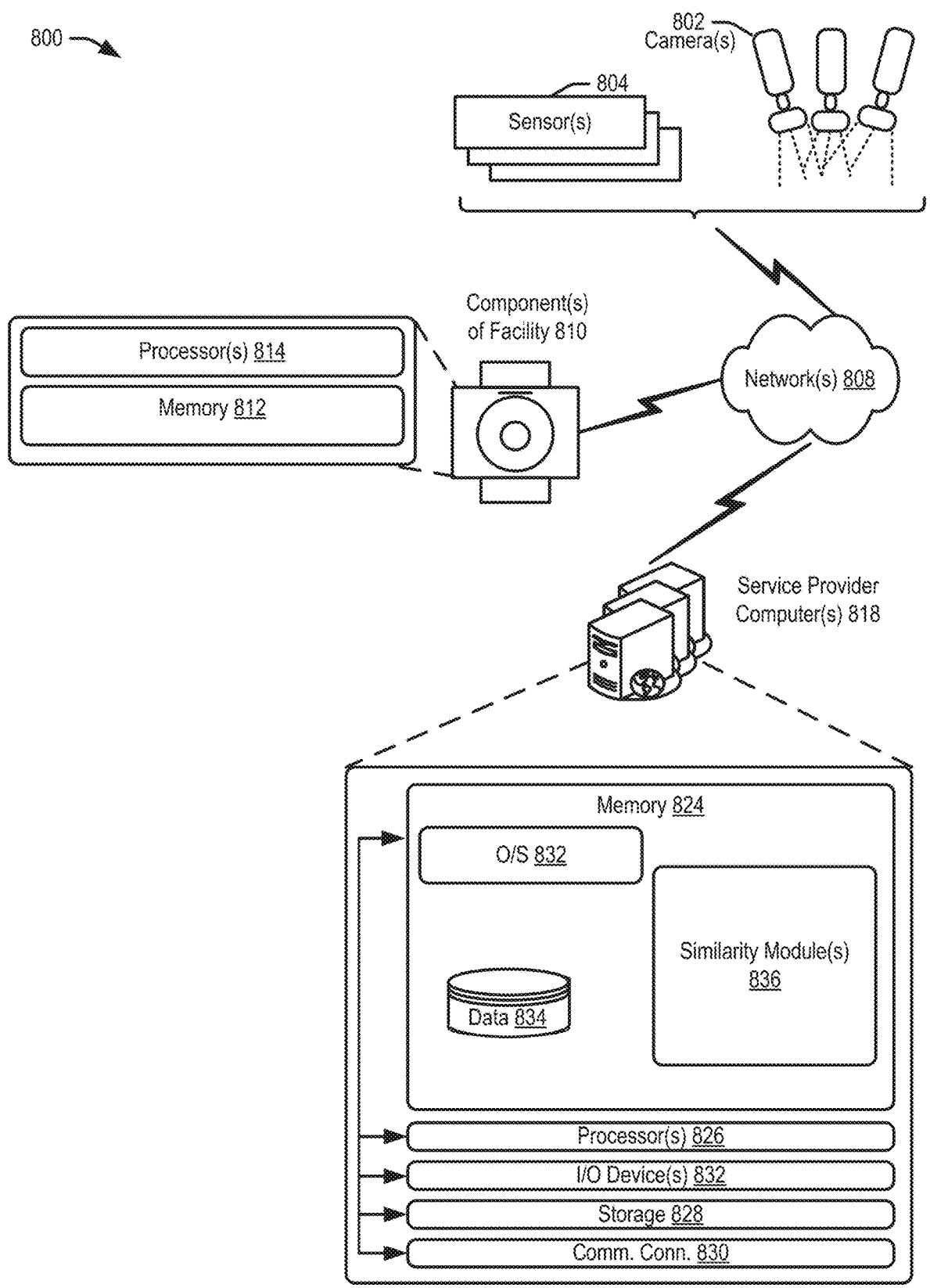
FIG. 8 illustrates an example architecture for implementing a similarity feature as described herein that includes one or more service provider computers, a component for a facility, and cameras and sensors of the facility connected via one or more networks in accordance with at least one embodiment.

FIG. 8 illustrates an example architecture for implementing a similarity feature as described herein that includes one or more service provider computers, a component for a facility, and cameras and sensors of the facility connected via one or more networks in accordance with at least one embodiment. In architecture 800, one or more camera(s) 802 (video cameras, photographic cameras, infrared cameras, etc.) and sensors 804 (weight sensors, physical dimension sensors, etc.) may be situated at a receiving area of a facility to capture images, from multiple angles, of packages received at the facility as well as obtain physical attributes of received packages such as the weight and physical dimensions of the received packages. In embodiments, the similarity feature described herein is not limited to a plurality of cameras 802 capturing images of a package from a plurality of angles. Embodiments disclosed herein also include using video captured the plurality of cameras 802 from multiple angles where images may be derived from frames of the captured video. Further, embodiments disclosed herein may utilize a single camera 802 that captures a single image which is used to generate the visual vector for the package, extract text, etc. In single camera 802 embodiments, the camera may be instructed to move around the package to capture images or video using a robotic arm, gantry system, or other suitable technique for moving a camera 802 around an object such as a package. The one or more cameras 802 may be installed in a certain configuration so as to capture multiple angles of a package as it is received in a receiving area of the facility. In embodiments, the one or more cameras 802 and sensors 804 may be located at a different area of the facility while still being configured to capture images of a package and obtain physical attributes of a package. In accordance with at least one embodiment, images and physical attributes captured or otherwise obtained by the one or more cameras 802 and sensors 804 may be transmitted via networks 808 to one or more service provider computers 818. In embodiments, the one or more cameras 802 and sensors 804 may have a receiver and a transmitter(s) (not pictured) for communicating with one or more transmitters in the facility and/or the service provider computers (one or more service provider computers) 818 via networks 808.

The architecture 800 may also include a component 810 of a facility that may be configured to perform a task within a facility in response to signals or instructions provided by a computer such as service provider computers 818 or a computer system of a facility or user device. In embodiments, the component 810 of a facility may include at least one memory 812 and one or more processing units or processor(s) 814. The memory 812 may store program instructions that are loadable and executable on the processor(s) 814, as well as data generated during the execution of these programs. Depending on the configuration and type of component 810, the memory 812 may be volatile (such as random access memory (RAM)) and/or non-volatile (such as read-only memory (ROM), flash memory, etc.). The component 810 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the component 810. In some implementations, the memory 812 may include multiple different types of memory, such as static random access memory (SRAM), dynamic random access memory (DRAM), or ROM. In embodiments, the component 810 may have a receiver and a transmitter(s) (not pictured) for communicating with one or more transmitters in the facility and/or the service provider computers 818 via networks 808.

Turning to the contents of the memory 812 in more detail, the memory 812 may include an operating system and one or more application programs or services for completing assigned tasks. Additionally, the memory 812 may include one or more modules for receiving, processing, and completing assigned tasks within the facility based on instructions received from the service provider computers 818.

The architecture 800 may also include one or more service provider computers 818 that may, in some examples, provide computing resources such as, but not limited to, client entities, low latency data storage, durable data storage, data access, management, virtualization, hosted computing environment or "cloud-based" solutions, electronic content performance management, facility tasks, package similarity determination and identification, etc.

In some examples, the networks 808 may include any one or a combination of many different types of networks, such as cable networks, the Internet, wireless networks, cellular networks and other private and/or public networks. While the illustrated example represents the cameras 802, sensors 804, and component 810 of the facility communicating with the service provider computers 818 over the networks 808, the described techniques may equally apply in instances where the cameras 802, sensors 804, and component 810 interact with the one or more service provider computers 818 via a landline or hardwire network connection. It is also noted that the described techniques may apply in other client/server arrangements (e.g., set-top boxes, etc.), as well as in non-client/server arrangements (e.g., locally stored applications, peer-to-peer arrangements, etc.). In embodiments, the networks 808 may include devices that act as transmitters and receivers of local area wireless network signals (e.g., "Wi-Fi", Long Term Evolution (LTE), Bluetooth, WirelessHD and WiGig, and Z-Wave). The component 810 of the facility may utilize associated receivers and transmitters (not pictured) to provide status information for the component such as operating status, current speed, location, etc., to service provider computers 818 via networks 808. In embodiments, the service provider computers 818 may transmit requests for the status information as well as instructions for completing a task associated with a package, such as a package that is received at the facility, to the component 810 of the facility via networks 808 as well as receive responses from the component 810 of the facility via networks 808.

The one or more service provider computers 818 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 818 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 818 may be in communication with the one or more cameras 802, sensors 804, and component 810 via the networks 808, or via other network connections. The one or more service provider computers 818 may include one or more servers, perhaps arranged in a cluster or as individual servers not associated with one another.

In one illustrative configuration, the one or more service provider computers 818 may include at least one memory 824 and one or more processing units or processors(s) 826. The processor(s) 826 may be implemented as appropriate in hardware, computer-executable instructions, firmware, or combinations thereof. Computer-executable instruction or firmware implementations of the processor(s) 826 may include computer-executable or machine-executable instructions written in any suitable programming language to perform the various functions described when executed by a hardware computing device, such as a processor. The memory 824 may store program instructions that are loadable and executable on the processor(s) 826, as well as data generated during the execution of these programs. Depending on the configuration and type of the one or more service provider computers 818, the memory 824 may be volatile (such as RAM) and/or non-volatile (such as ROM, flash memory, etc.). The one or more service provider computers 818 or servers may also include additional storage 828, which may include removable storage and/or non-removable storage. The additional storage 828 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 824 may include multiple different types of memory, such as SRAM, DRAM, or ROM.

The memory 824, the additional storage 828, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 824 and the additional storage 828 are all examples of non-transitory computer storage media. Additional types of non-transitory computer storage media that may be present in the one or more service provider computers 818 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 818. Combinations of any of the above should also be included within the scope of non-transitory computer-readable media.

The one or more service provider computers 818 may also contain communication connection interface(s) 830 that allow the one or more service provider computers 818 to communicate with a data store, another computing device or server, user terminals and/or other devices on the networks 808. The one or more service provider computers 818 may also include I/O device(s) 832, such as a keyboard, a mouse, a pen, a voice input device, a touch input device, a display, speakers, a printer, etc.

Turning to the contents of the memory 824 in more detail, the memory 824 may include an operating system 832, one or more data stores 834, and/or one or more application programs or services for implementing the features disclosed herein including the similarity module(s) 836. In accordance with at least one embodiment, the similarity module(s) 836 may be configured to receive or obtain images of a package as well as physical attributes of a package at a facility. The images may be used to generate, by the similarity module(s) 836 one or more vectors for comparison to vectors generated from historically received packages in a vector space of package attributes. In embodiments, the similarity module(s) 836 may be configured to train and implement a machine learning algorithm for generating vectors from images, text, or other information from packages, as well as comparing vectors of packages within a vector space of package attributes. In accordance with at least one embodiment, the similarity module(s) 836 may be configured to implement an OCR algorithm for extracting text or machine-readable codes from images of packages as well as implementing a nearest neighbor algorithm for determining distances between vectors in a vector space. In embodiments, the similarity module(s) 836 may be configured to determine subsets of candidate packages from a plurality of historically received packages as well as rank the subset of candidate packages using physical attributes of the package and/or vectors of the package. The similarity module(s) 836 may be configured to generate and transmit instructions to a component of facility 810 via networks 808 for routing, transporting, or performing another suitable task for a received package based on data for a similar package as described herein. In embodiments, the similarity module(s) 836 may be configured to generate and transmit instructions to component(s) of facility 810, via networks 808, for completing an assigned task such as routing/transporting the package from one area of the facility to another area of the facility.

Figure 9:
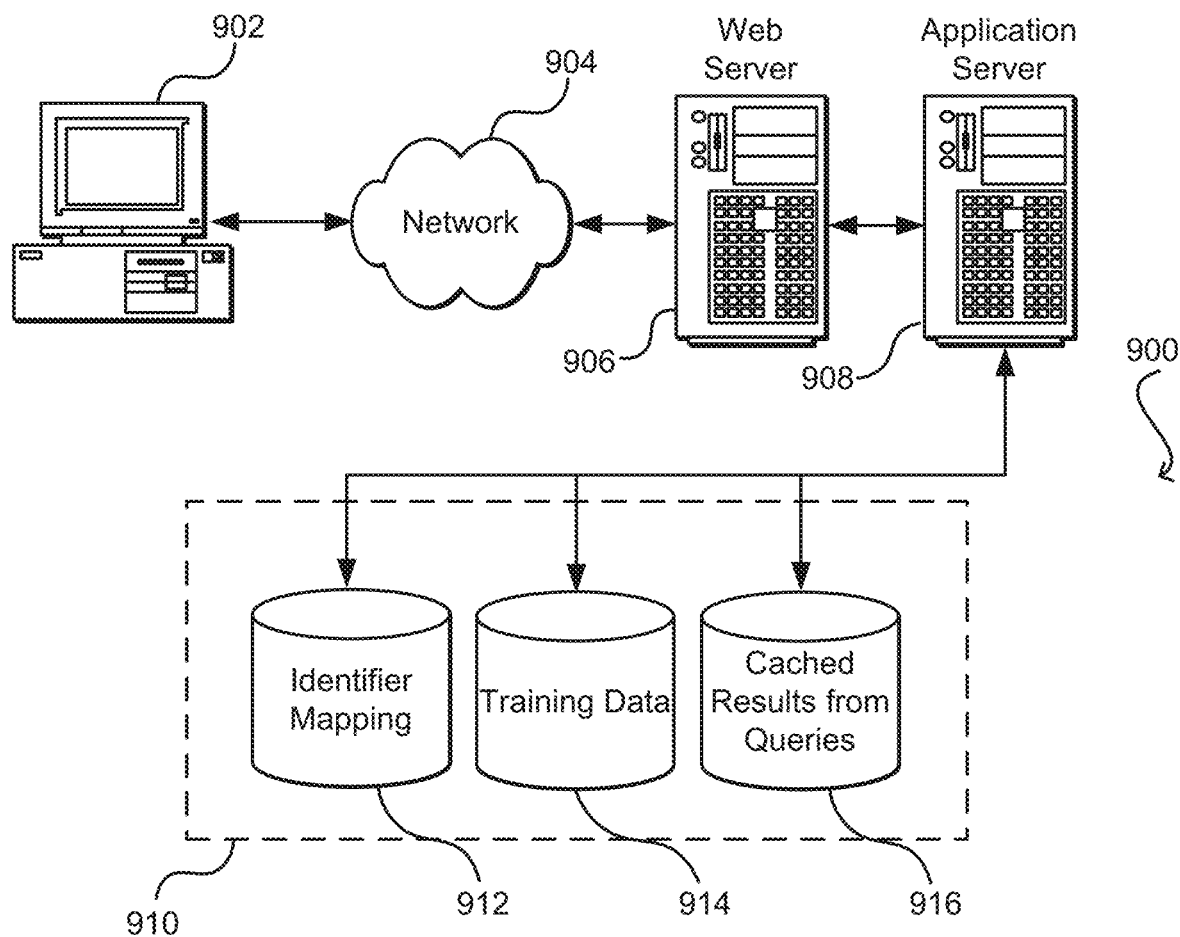
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store, implementing algorithms such as machine learning algorithms, OCR algorithms, nearest neighbor algorithms, etc. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example, as well as generate vectors for received packages based on received images of said packages and execute queries to identify similar historical packages and retrieve data associated with the similar packages to predict the content and/or manufacturer of the received and analyzed package without manually opening the received package. The handling of all requests and responses, as well as the delivery of content between the client device 902 and the application server 908 (such as query results for a similar package and data of the similar package), can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing a mapping of identifiers of packages and/or vectors to data for packages (weight, dimensions, manufacturer, product ID, product category, etc.) 912 and cached results from queries 916, which can be used to serve content for the production side such as by providing a prediction of the contents and/or manufacturer of a received item based on analyzed data (images, text, physical attributes) of the package without having to manually open the package. The data store also is shown to include a mechanism for storing training data 914, which can be used for reporting, analysis, or other such purposes such as training and updating machine learning algorithms utilized in the similarity feature described herein. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser. In another example, information for a package received at a facility may be analyzed to generate vectors for submitting a query to identify a similar package(s) to obtain data for the received package without opening the received package.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle °, Microsoft °, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, images of a package from a plurality of cameras associated with the computer system, the plurality of cameras located at a receiving area of a facility, the facility associated with the computer system;
   generating, by the computer system, a visual vector for a vector space of package attributes using the images;
   generating, by the computer system, a text vector for the vector space by executing an OCR algorithm that uses the images to extract text from the images;
   receiving, by the computer system, physical dimensions and a weight of the package obtained by a plurality of sensors associated with the computer system;
   generating, by the computer system, a combined vector that includes the visual vector and the text vector for the package;
   determining, by the computer system, a subset of candidate packages of a plurality of historically received packages by comparing the physical dimensions and the weight of the package to the physical dimensions and the weight of the plurality of historically received packages;
   determining, by the computer system, a ranking of the subset of candidate packages by identifying a distance in the vector space of the package attributes between a vector for each candidate package of the subset of candidate packages and the combined vector for the package using a nearest neighbor algorithm, the ranking of the subset of candidate packages representing a similarity between said each candidate package of the subset of candidate packages and the package within the vector space of the package attributes;
   obtaining, by the computer system and for a particular package of the ranked subset of candidate packages, an identifier associated with the particular package;
   retrieving, by the computer system and from a database, data for the particular package using the identifier, the database maintaining a mapping of identifiers to data for the plurality of historically received packages, the data including at least one of a quantity of an item for the particular package or a product identifier for the particular package;
   generating, by the computer system, instructions for components of the facility to route the package from the receiving area of the facility to a particular location of the facility based at least in part on the data for the particular package; and
   transmitting, by the computer system, the instructions to the components of the facility to transport the package from the receiving area of the facility to the particular location of the facility.

2. The computer-implemented method of claim 1, wherein the plurality of cameras are placed within a certain configuration at the receiving area to obtain multiple different angles of the package in the images.

3. The computer-implemented method of claim 1, wherein the particular package is a highest ranked candidate package from the ranking of the subset of candidate packages.

4. The computer-implemented method of claim 1, wherein the data for the particular package further includes a manufacturer of the particular package, the weight of the particular package, the physical dimensions of the particular package, and an item category identifier for the particular package.

5. The computer-implemented method of claim 1, wherein the components of the facility include one or more of conveyor belts, autonomous guided vehicles, or robotic arms.

6. A non-transitory computer-readable storage medium storing computer-executable instructions that, when executed by a computer system, configure the computer system to perform operations, comprising:
   receiving an image of a package from a camera associated with the computer system, the camera located at a receiving area of a facility, the facility associated with the computer system;
   generating a visual vector for the package in a vector space of package attributes using the image;
   receiving physical attributes of the package obtained by a plurality of sensors associated with the computer system;
   determining a subset of candidate packages of a plurality of historically received packages by comparing the physical attributes of the package to the physical attributes of the plurality of historically received packages;
   determining a ranking of the subset of candidate packages by identifying a distance in the vector space of the package attributes between a vector for each candidate package of the subset of candidate packages and the visual vector for the package using a nearest neighbor algorithm, the ranking of the subset of candidate packages representing a similarity between said each candidate package of the subset of candidate packages and the package within the vector space of the package attributes;
   obtaining, for a particular package of the ranked subset of candidate packages, an identifier associated with the particular package; and
   retrieving, from a database, data for the particular package using the identifier, the database maintaining a mapping of identifiers to data for the plurality of historically received packages, the data including at least one of a quantity of an item for the particular package or a product identifier for the particular package.

7. The non-transitory computer-readable storage medium of claim 6, wherein the instructions, when executed by the computer system, further configure the computer system to perform operations comprising:
   generating instructions for components of the facility to route the package from the receiving area of the facility to a particular location of the facility based at least in part on the data for the particular package; and
   transmitting the instructions to the components of the facility to transport the package from the receiving area of the facility to the particular location of the facility.

8. The non-transitory computer-readable storage medium of claim 6, wherein the instructions, when executed by the computer system, further configure the computer system to perform operations comprising:
   generating instructions for components of the facility to route the package from the receiving area of the facility to a particular location of the facility based at least in part on the distance in the vector space of the package attributes between the vector for each candidate package of the subset of candidate packages and the visual vector for the package using the nearest neighbor algorithm, the particular location of the facility associated with manually opening the package to identify contents of the package; and transmitting the instructions to the components of the facility to transport the package from the receiving area of the facility to the particular location of the facility.

9. The non-transitory computer-readable storage medium of claim 8, wherein generating the instructions for the components is further based at least in part on the distance exceeding a threshold distance within the vector space of the package attributes.

10. The non-transitory computer-readable storage medium of claim 9, wherein the threshold distance is specified by an administrator associated with the computer system or a manufacturer of the package.

11. The non-transitory computer-readable storage medium of claim 6, wherein the instructions, when executed by the computer system, further configure the computer system to perform operations comprising training a machine learning algorithm using the data of the historically received packages and the vector for each package of the historically received packages.

12. The non-transitory computer-readable storage medium of claim 11, wherein the instructions, when executed by the computer system, further configure the computer system to perform operations comprising receiving verification data that verifies the data of the particular package as the data for the package.

13. The non-transitory computer-readable storage medium of claim 12, wherein the machine learning algorithm is updated using the verification data.

14. A computer system associated with a facility comprising:
  a memory configured to store computer-executable instructions;
  a plurality of cameras located at a receiving area of the facility and configured to capture images of a package;
  a plurality of sensors associated with the facility and configured to obtain physical attributes of the package; and
  a processor in communication with the memory configured to execute the computer-executable instructions to at least:
    receive the images of the package from the plurality of cameras;
    generate a visual vector for the package in a vector space of package attributes using the images;
    receive the physical attributes of the package;
    determine a subset of candidate packages of a plurality of historically received packages by comparing the physical attributes of the package to the physical attributes of historically received packages;
    determine a ranking of the subset of candidate packages by identifying a distance in the vector space of the package attributes between a vector for each candidate package of the subset of candidate packages and the visual vector for the package using an algorithm, the ranking of the subset of candidate packages representing a similarity between said each candidate package of the subset of candidate packages and the package within the vector space of the package attributes;
    obtain, for a particular package of the ranked subset of candidate packages, an identifier associated with the particular package; and
    retrieve, from a database, data for the particular package using the identifier, the database maintaining a mapping of identifiers to data for the plurality of historically received packages, the data including at least one of a quantity of an item for the particular package or a product identifier for the particular package.

15. The computer system of claim 14, wherein the algorithm includes an approximate nearest neighbor algorithm or a k-nearest neighbors algorithm.

16. The computer system of claim 14, further comprising components configured to transport the package within the facility, wherein the processor in communication with the memory is further configured to execute the computer-executable instructions to at least:
  generate instructions for the components of the facility to route the package from the receiving area of the facility to a particular location of the facility based at least in part on the data for the particular package; and
  transmit the instructions to the components of the facility to transport the package from the receiving area of the facility to the particular location of the facility.

17. The computer system of claim 14, wherein the processor in communication with the memory is further configured to execute the computer-executable instructions to at least obtain information from a machine-readable code of the package, the machine-readable code detected by an OCR algorithm executed by the computer system using the images of the package.

18. The computer system of claim 17, wherein determining the subset of candidate packages includes using the information from the machine-readable code of the package.

19. The computer system of claim 14, wherein generating the visual vector for the package in the vector space of package attributes includes implementing one or more computer vision techniques to remove background noise or artifacts from the images of the package.

20. The computer system of claim 14, wherein the processor in communication with the memory is further configured to execute the computer-executable instructions to at least store the subset of candidate packages in a data cache for use in processing subsequently received packages at the facility.

* * * * *